(12) United States Patent
Ikari

(10) Patent No.: US 10,968,413 B2
(45) Date of Patent: Apr. 6, 2021

(54) VINYL-BASED COMB POLYMER

(71) Applicant: KANEKA CORPORATION, Osaka (JP)

(72) Inventor: Yoshihiro Ikari, Osaka (JP)

(73) Assignee: KANEKA CORPORATION, Osaka (JP)

(*) Notice: Subject to any disclaimer, the term of this patent is extended or adjusted under 35 U.S.C. 154(b) by 9 days.

(21) Appl. No.: 16/571,795

(22) Filed: Sep. 16, 2019

(65) Prior Publication Data

US 2020/0010775 A1    Jan. 9, 2020

Related U.S. Application Data

(63) Continuation of application No. PCT/JP2018/010194, filed on Mar. 15, 2018.

(30) Foreign Application Priority Data

Mar. 16, 2017 (JP) .............................. JP2017-050692

(51) Int. Cl.
| | |
|---|---|
| *C10M 145/14* | (2006.01) |
| *C08F 290/04* | (2006.01) |
| *C10M 169/04* | (2006.01) |
| *C10N 20/04* | (2006.01) |
| *C10N 20/00* | (2006.01) |

(52) U.S. Cl.
CPC ....... *C10M 145/14* (2013.01); *C08F 290/048* (2013.01); *C10M 169/041* (2013.01); *C10M 2209/084* (2013.01); *C10N 2020/04* (2013.01); *C10N 2020/071* (2020.05)

(58) Field of Classification Search
CPC ............ C10M 145/14; C10M 169/041; C10M 2209/084; C10M 169/04; C08F 290/048; C08F 290/04; C10N 2020/04; C10N 2020/071
See application file for complete search history.

(56) References Cited

U.S. PATENT DOCUMENTS

| | | | |
|---|---|---|---|
| 5,597,871 A | 1/1997 | Auschra et al. | |
| 5,721,331 A | 2/1998 | Shachi et al. | |
| 2008/0194443 A1* | 8/2008 | Stohr ................... | C08F 299/00 508/469 |
| 2010/0190671 A1 | 7/2010 | Stoehr et al. | |
| 2012/0216953 A1 | 8/2012 | Bharti et al. | |
| 2014/0243444 A1* | 8/2014 | Ikari ....................... | C08F 8/00 522/28 |
| 2017/0051093 A1 | 2/2017 | Ikari et al. | |
| 2018/0362676 A1 | 12/2018 | Ikari | |
| 2019/0169346 A1 | 6/2019 | Misske et al. | |

FOREIGN PATENT DOCUMENTS

| | | |
|---|---|---|
| EP | 2164885 A1 | 3/2010 |
| EP | 3388454 A1 | 10/2018 |
| JP | H08169922 A | 7/1996 |
| JP | H08301939 A | 11/1996 |
| JP | 2008546894 A | 12/2008 |
| JP | 2013511593 A | 4/2013 |
| JP | 2013216782 A | 10/2013 |
| JP | 2016145268 A | 8/2016 |
| WO | 2008/138836 A2 | 11/2008 |
| WO | 2013047314 A1 | 4/2013 |
| WO | 2017/029978 A1 | 2/2017 |
| WO | 2018024563 A1 | 2/2018 |

OTHER PUBLICATIONS

International Search Report issued in corresponding Patent Application No. PCT/JP2018/010194; dated Jun. 19, 2018 (2 pages).
Written Opinion of the International Searching Authority issued in corresponding Patent Application No. PCT/JP2018/010194; dated Jun. 19, 2018 (3 pages).
Extended European Search Report issued in corresponding European Application No. 18767141.7 dated Dec. 10, 2020 (8 pages).
Edward L. Malins et al., "Controlled Synthesis of Amphiphilic Block Copolymers Based on Poly(Isobutetylene) Macromonomers"; Journal of Polymer Science Part A: Polymer Chemistry, vol. 54, No. 5, pp. 634-643; Sep. 23, 2015 (10 pages).

* cited by examiner

*Primary Examiner* — Taiwo Oladapo
(74) *Attorney, Agent, or Firm* — Osha Bergman Watanabe & Burton LLP

(57) ABSTRACT

A vinyl-based comb copolymer includes a polyisobutylene-based macromonomer unit and a vinyl-based monomer unit. A polyisobutylene-based macromonomer has at least 0.8 (meth)acryloyl groups represented by a specific formula at one end of a main chain per molecule, and is copolymerized with a vinyl-based monomer. A method for producing the vinyl-based comb copolymer includes copolymerizing the polyisobutylene-based macromonomer with the vinyl-based monomer. A viscosity index improver includes the comb copolymer. A lubricating oil composition includes the comb copolymer.

11 Claims, No Drawings

VINYL-BASED COMB POLYMER

RELATED APPLICATION

This application is a continuation of PCT/JP2018/010194, filed Mar. 15, 2018 which claims priority of Japanese Patent Application No. 2017-050692, filed Mar. 16, 2017, which are incorporated by reference in their entirety.

TECHNICAL FIELD

One or more embodiments of the present invention relate to a vinyl-based comb polymer having a polyisobutylene-based polymer in a side chain.

BACKGROUND

Graft copolymers having a comb-like structure, together with block copolymers, have attracted attention in the field of polymeric materials. These graft copolymers are characterized by having properties arising from constituent segments and exhibiting functions derived from a microphase separation as well that found in thermoplastic elastomers and impact resistant plastics.

Although graft polymers have been used to modify polymers for a long time, it has recently been successful in synthesizing a polymer having a controlled structure. The concept of high-molecular-weight monomers (macromonomers) has been shown by Milkovich et al, and by copolymerizing these macromonomers, polymers having a distinct comb-like structure have been able to be synthesized.

Examples of industrial applications of graft polymers include the pressure-sensitive adhesive described in Patent Literature 1, for example. This literature discloses a technology using a polyisobutylene macromonomer having a carboxy group or an amino group as an adhesive material, and reports that the pressure-sensitive adhesive has excellent adhesion to a low surface energy substrate by providing a hydrogen bonding functional group in the molecule of the macromonomer.

Patent Literature 2 reports an example in which a polyisobutylene-based polymer having a specific molecular weight distribution is suitably used as a viscosity index improver.

Furthermore, an example of using a polyisobutylene-based macromonomer as a viscosity index improver is provided in Patent Literature 3. The polyisobutylene-based macromonomer described in Patent Literature 3 includes macromonomers derived from a polyolefin-based macroalcohol, a polyolefin-based inacroamine, or an OH-functionalized hydrogenated butadiene which have 54 to 96% of methacrylate functionality per one molecule and are examined as a viscosity index improver.

Patent Literature 4 discloses a hydrocarbon-based macromonomer obtained by a specific production method, and a comb polymer containing the hydrocarbon-based macromonomer.

Patent Literatures 5, 6, and 7 each, propose a polyisobutylene-based polymer having a (meth)acryloyl group at polymer chain ends. However, these literatures do not disclose a macromonomer having a functional group at one end, and there is room for further consideration.

PATENT DOCUMENTS

[PTL 1] Japanese Laid-Open Patent Publication (Translation of PCT Application) No. 2013-511593

[PTL 2] Japanese Laid-Open Patent Publication No. H8-301939

[PTL 3] Japanese Laid-Open Patent Publication (Translation of PCT Application) No. 2008-546894

[PTL 4] Japanese Laid-Open Patent Publication No. H8-169922

[PTL 5] WO 2013/047314

[PTL 6] Japanese Laid-Open Patent Publication No. 2013-216782

[PTL 7] Japanese Laid-Open Patent Publication No. 2016-145268

Generally, in the case of using a comb polymer as a viscosity index improver, if the solubility of the comb polymer in a lubricating oil is insufficient, the comb polymer may deposit during long-term storage, and may be separated from the lubricating oil or may precipitate. In this case, the comb polymer can no longer serve as a viscosity index improver. Therefore, it is important for the comb polymer to have sufficient solubility in the lubricating oil.

It is considered that for a polymer used for a viscosity index improver, it is better not to have a functional group that exerts an attractive interaction, such as a hydrogen bonding functional group, in a molecule. This is because it is generally considered that hydrogen bonding acts better at lower temperatures than at higher temperatures, and it is considered that when a polymer having such a functional group in a molecule is used as a viscosity index improver, a decrease of the viscosity at higher temperatures cannot be inhibited efficiently while the viscosity at lower temperatures increases. Examples of this functional group include a carboxy group, a hydroxy group, an amino group, and an amide group.

Moreover, as described later, in the case where a viscosity index improver composed of only a polyisobutylene-based polymer is used for a lubricating oil composition, the effect of significantly increasing the viscosity of the lubricating oil composition is high, and there is room for improvement in use as lubricating oil.

Furthermore, in the case where a polyisobutylene-based macromonomer is used as a viscosity index improver, it becomes clear that the temperature dependence of viscosity and the solubility of the vinyl-based comb copolymer are influenced by the functionalization rate at the polymer end. Thus, there is room for improvement in use of the conventional polyisobutylene-based macromonomer as a viscosity index improver.

On the other hand, in the production of macromonomers, living polymerization technology is used, and the polymerization step and the functional group introduction step are often separate steps. Thus, the production process may become complicated, and the productivity may decrease. A simple method with high productivity and reduced number of steps is provided in one or more embodiments of the present invention, in which each step is completed in as short a time as possible. As an example, a macromonomer synthesis method is known to introduce a desired functional group by a multistep reaction, but a production method that can achieve a high functional group introduction rate in the shortest possible production process is industrially required. The polymer reaction is generally not efficient in many cases, and a desired polymer cannot be obtained because, for example, the functional group introduction rate decreases as the number of stages of the reaction step is increased.

Therefore, there is room for further improvement in efficient production of a vinyl-based comb polymer having polyisobutylene in a side chain or use of the vinyl-based comb polymer as a viscosity index improver.

SUMMARY

One or more embodiments of the present invention provide a vinyl-based comb polymer having polyisobutylene in a side chain. Particularly, one or more embodiments of the present invention provide a vinyl-based comb polymer that has polyisobutylene in a side chain and that can be suitably used for a lubricating oil composition or a viscosity index improver.

One or more embodiments of the present invention provide (1) A vinyl-based comb copolymer that is a polymer of: a polyisobutylene-based macromonomer (A) having at least 0.8 (meth)acryloyl groups represented by general formula (1), at one end of a main chain within one molecule; and a vinyl-based monomer (B). As used herein, the term "within one molecule" means "per molecule" and "on an average in one molecule".

[Chem. 1]

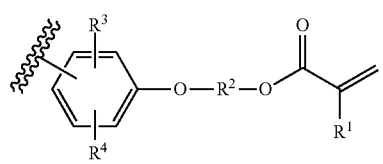

(1)

wherein $R^1$ represents hydrogen or a methyl group, $R^2$ represents a divalent saturated hydrocarbon group having 2 to 6 carbon atoms and having no hetero atoms, and $R^3$ and $R^4$ each represent hydrogen, a monovalent hydrocarbon group having 1 to 20 carbon atoms, or an alkoxy group.

(2) The vinyl-based comb copolymer, wherein the vinyl-based comb copolymer contains 0.05 to 20 mol % of a polyisobutylene-based macromonomer (A) unit.

(3) The vinyl-based comb copolymer, wherein a molecular weight distribution (Mw/Mn) of the polyisobutylene-based macromonomer (A) is 1.0 to 1.8.

(4) The vinyl-based comb copolymer, wherein a number-average molecular weight (Mn) of the polyisobutylene-based macromonomer (A) is 1,000 to 200,000 as a value obtained by size exclusion chromatography (SEC) measurement based on polystyrene standards.

(5) The vinyl-based comb copolymer, wherein $R^2$ in the general formula (1) is at least one divalent hydrocarbon group selected from the group consisting of —$CH_2CH_2$—, —$CH_2CH_2CH_2$—, and —$CH_2CH_2CH_2CH_2$—.

(6) The vinyl-based comb copolymer, wherein $R^3$ and $R^4$ in the general formula (1) are each hydrogen.

(7) The vinyl-based comb copolymer, wherein $R^1$ in the general formula (1) is a methyl group.

(8) The vinyl-based comb copolymer, wherein the vinyl-based monomer (B) is at least one vinyl-based monomer selected from the group consisting of styrene, methylstyrene, α-methylstyrene, indene, and a (meth)acrylic acid ester represented by the following general formula (2).

[Chem. 2]

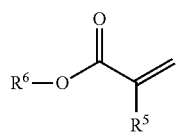

(2)

wherein $R^5$ represents hydrogen or a methyl group, and $R^6$ represents a monovalent organic group having 1 to 25 carbon atoms.

(9) A method for producing the above vinyl-based comb copolymer, the method comprising copolymerizing the polyisobutylene-based macromonomer (A) with the vinyl-based monomer (B).

(10) A viscosity index improver containing the above comb copolymer.

(11) A lubricating oil composition containing the above comb copolymer.

According to one or more embodiments of the present invention, it is possible to obtain a vinyl-based comb polymer that has polyisobutylene in a side chain and that can be suitably used for a viscosity index improver or a lubricating oil composition.

DETAILED DESCRIPTION OF THE EMBODIMENTS

A vinyl-based comb copolymer having polyisobutylene in a side chain (hereinafter, simply abbreviated as vinyl-based comb polymer) according to one or more embodiments of the present invention is formed from a polyisobutylene-based macromonomer (A) having at least 0.8 (meth)acryloyl groups represented by general formula (1) at one end of a main chain within one molecule (hereinafter, sometimes simply abbreviated as polyisobutylene-based macromonomer (A)), and a vinyl-based monomer (B).

[Chem. 3]

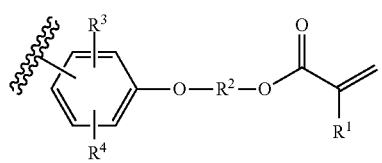

(1)

($R^1$ represents hydrogen or a methyl group, $R^2$ represents a divalent saturated hydrocarbon group having 2 to 6 carbon atoms and having no hetero atoms, and $R^3$ and $R^4$ each represent hydrogen, a monovalent hydrocarbon group having 1 to 20 carbon atoms, or an alkoxy group.)

The weight-average molecular weight of the vinyl-based comb copolymer in one or more embodiments of the present invention measured by size exclusion chromatography (SEC) based on polystyrene standards may be 5,000 to 2,000,000 and may be 10,000 to 1,000,000. If the weight-average molecular weight is less than 5,000, the vinyl-based comb copolymer may lack in characteristics as a viscosity index improver. Thus, it may not be preferable that the weight-average molecular weight be less than 5,000. On the other hand, if the weight-average molecular weight is larger than 2,000,000, the viscosity of the lubricating oil may significantly increase, or processability may be lacking, so that handling may be difficult. Thus, it may not be preferable that the weight-average molecular weight be larger than 2,000,000.

From the viewpoint of being able to be suitably used for a viscosity index improver, a molecular weight distribution (a value represented by (weight-average molecular weight Mw)/(number-average molecular weight Mn)) of the vinyl-based comb copolymer in one or more embodiments of the present invention may be within the range of 1.0 to 8.0 and may be within the range of 1.1 to 6.0. If the molecular weight distribution is greater than 8.0, the characteristics as a viscosity index improver may not be able to be maintained over a long period of time. Thus, it may not be preferable that the molecular weight distribution be greater than 8.0.

The vinyl-based comb copolymer in one or more embodiments of the present invention may contain a polyisobutylene-based macromonomer (A) unit within the range of 0.05 to 20 mol % per total amount (100 mol %) of the monomer units forming the vinyl-based comb copolymer. From the viewpoint of maintaining sufficient solubility in the lubricating oil over a long period of time, the vinyl-based comb copolymer in another embodiment of the present invention may contain the polyisobutylene-based macromonomer (A) unit within the range of 0.1 to 10 mol %.

If the amount of the polyisobutylene-based macromonomer (A) unit is less than 0.05 mol %, oil solubility derived from the polyisobutylene side chain is less likely to be exhibited. Thus, it may not be preferable that the amount of the polyisobutylene-based macromonomer (A) unit be less than 0.05 mol %. On the other hand, if the amount of the polyisobutylene-based macromonomer (A) unit is greater than 20 mol %, the viscosity of the lubricating oil may excessively increase. Thus, it may not be preferable that the amount of the polyisobutylene-based macromonomer (A) unit be greater than 20 mol %.

As the monomer that forms the polyisobutylene-based polymer main chain of the polyisobutylene-based macromonomer (A) according to one or more embodiments of the present invention, isobutylene is mainly used. Other than mainly using isobutylene, other cationically polymerizable monomers may be copolymerized.

Examples of such other cationically polymerizable monomers include olefins having 4 to 12 carbon atoms (excluding isobutylene), vinyl ethers, aromatic vinyl compounds, vinylsilanes, and allylsilanes. Specific examples of other such cationically polymerizable monomers include isoprene, amylene, 1,3-butadiene, 1-butene, 2-butene, 2-methyl-1-butene, 3-methyl-1-butene, pentene, 4-methyl-1-pentene, hexene, vinylcyclohexene, α-pinene, β-pinene, limonene, styrene, indene, α-methylstyrene, methoxystyrene, methylstyrene (including ortho-methylstyrene, meta-methylstyrene, para-methylstyrene), trimethylstyrene, chlorostyrene, dichlorostyrene, methyl vinyl ether, ethyl vinyl ether, isobutyl vinyl ether, vinyltrichlorosilane, vinylmethyldichlorosilane, vinyldimethylchlorosilane, vinyldimethylmethoxysilane, vinyltrimethylsilane, divinyldichlorosilane, divinyldimethoxysilane, divinyldimethylsilane, 1,3-divinyl-1,1,3,3-tetramethyldisiloxane, trivinylmethylsilane, tetravinylsilane, allyltrichlorosilane, allylmethyldichlorosilane, allyldimethylchlorosilane, allyldimethylmethoxysilane, allyttrimethylsilane, diallyldimethoxysilane, and diallyldimethylsilane.

Among them, isoprene, amylene, 1,3-butadiene, 1-butene, α-pinene, β-pinene, limonene, styrene, indene, α-methylstyrene, methylstyrene (including ortho-methylstyrene, meta-methylstyrene, para-methylstyrene), methyl vinyl ether, ethyl vinyl ether, and isobutyl vinyl ether may be used from the viewpoint of copolymerizability.

In the case of using other monomer that is polymerizable with isobutylene, the other monomer may be contained in the range of 50% by weight or less, 30% by weight or less, or 10% by weight or less in the isobutylene-based polymer.

$R^1$ in the above general formula (1) represents hydrogen or a methyl group. When $R^1$ is hydrogen, the terminal functional group is an acryloyl group, and, when $R^1$ is a methyl group, the terminal functional group is a methacryloyl group. These terminal functional groups can be optionally selected depending on reactivity with the vinyl-based monomer (B). In particular, when $R^1$ is a methyl group, the obtained comb copolymer has enhanced heat resistance. Thus, $R^1$ may be a methyl group.

$R^2$ in the above general formula (1) represents a divalent saturated hydrocarbon group having 2 to 6 carbon atoms and containing no hetero atoms. Specific examples of such a divalent saturated hydrocarbon group include —$CH_2CH_2$—, —$CH_2CH_2CH_2$—, —$CH_2CH_2CH_2CH_2$, $CH_2CH_2CH_2CH_2CH_2$—, and —$CH_2CH_2CH_2CH_2CH_2CH_2$—. Among them, —$CH_2CH_2$—, —$CH_2CH_2CH_2$—, and —$CH_2CH_2CH_2CH_2$— may be used from the viewpoint of availability of raw materials and reactivity and —$CH_2CH_2CH_2$— may be used in another embodiment.

$R^3$ and $R^4$ in the above general formula (1) each represent hydrogen, a monovalent hydrocarbon group having 1 to 20 carbon atoms, or an alkoxy group. Specific examples of the monovalent hydrocarbon group having 1 to 20 carbon atoms or the alkoxy group include a methyl group, an ethyl group, a propyl group, an isopropyl group, a butyl group, a sec-butyl group, a tert-butyl group, a pentyl group, a hexyl group, a 2-ethylhexyl group, a nonyl group, a decanyl group, a methoxy group, an ethoxy group, a propoxy group, an isopropoxy group, and a butoxy group.

In one or more embodiments, $R^3$ and $R^4$ each may be hydrogen or a methyl group from the viewpoint of reactivity and further preferably hydrogen when availability of raw materials is also taken into consideration.

The molecular weight of the polyisobutylene-based macromonomer (A) according to one or more embodiments of the present invention is not particularly limited. However, from the viewpoint of handleability fluidity reactivity physical properties of the copolymer, etc., the molecular weight of the polyisobutylene-based macromonomer (A) may be 1,000 to 200,000 in one or more embodiments, 1,000 to 100,000 in another embodiment, 2,000 to 50,000 in yet another embodiment, 3,000 to 30,000 in yet another embodiment, and 5,000 to 20,000 in yet another embodiment, as a number-average molecular weight measured by size exclusion chromatography (SEC) based on polystyrene standards.

If the molecular weight is less than 1,000, physical properties that are characteristic of polyisobutylene may be less likely to be exhibited. Thus, it may not be preferable that the molecular weight be less than 1,000. On the other hand, if the molecular weight is larger than 200,000, fluidity and processability may be lacking, so that handling may be difficult. Thus, it may not be preferable that the molecular weight be larger than 200,000.

In one or more embodiments, a molecular weight distribution (a value represented by (weight-average molecular weight Mw)/(number-average molecular weight Mn)) of the polyisobutylene-based macromonomer (A) may be within the range of 1.0 to 1.8, within the range of 1.0 to 1.5, and within the range of 1.1 to 1.4, from the viewpoint of processing stability and ease of handling.

The number of (meth)acryloyl groups (functionalization rate) of the polyisobutylene-based macromonomer (A) in one or more embodiments of the present invention may be not less than 0.8, and not less than 0.9 in another embodiment, on average within one molecule. If the number of (meth)acryloyl groups is less than 0.8, the component that does not participate in copolymerization increases as a vinyl-based comb copolymer component, and in the case of being used for a lubricating oil composition, the viscosity of the lubricating oil tends to increase. Thus, it may not be preferable that the number of (meth)acryloyl groups be less than 0.8. The upper limit of the number of (meth)acryloyl groups of the polyisobutylene-based macromonomer (A) in one or more embodiments of the present invention is not particularly limited, and it is sufficient that the number of (meth)acryloyl groups is not greater than 1.0 on average within one molecule.

As for the method for producing the polyisobutylene-based macromonomer (A), the polyisobutylene-based macromonomer (A) according to one or more embodiments of the present invention can be produced by making reference to the production methods disclosed in WO 2013/047314.

Specifically, in one or more embodiments, a method, in which a polyisobutylene-based polymer skeleton is produced by living cationic polymerization of isobutylene in the presence of a Lewis acid catalyst such as $TiCl_4$ and an electron donor component such as a nitrogen-containing compound using a monofunctional polymerization initiator and then the end of the polymer is functionalized using a phenoxyalkyl (meth)acrylate-based compound or the like, can be industrially suitably used from the viewpoint of availability of raw materials and productivity In one or more embodiments, as a phenoxyalkyl (meth)acrylate-based compound for introducing a (meth)acryloyl group to the end of a polymer, 2-phenoxyethyl (meth)acrylate, 3-phenoxypropyl (meth)acrylate, 4-phenoxybutyl (meth)acrylate, 5-phenoxypentyl (meth)acrylate, 6-phenoxyhexyl (meth)acrylate, and the like can be suitably used from the viewpoint of availability of raw materials.

Among them, 2-phenoxyethyl (meth)acrylate, 3-phenoxypropyl (meth)acrylate, and 4-phenoxybutyl (meth)acrylate may be used in some embodiments from the viewpoint of availability of raw materials and reactivity, 3-phenoxypropyl (meth)acrylate may be used in another embodiment, and 3-phenoxypropyl methacrylate (phenoxypropyl methacrylate) may be used in yet another embodiment.

The vinyl-based comb copolymer according to one or more embodiments of the present invention contains a vinyl-based monomer (B) unit as an essential component in addition to the polyisobutylene-based macromonomer (A) unit.

Specific examples of the vinyl-based monomer (B) include: aromatic vinyl monomers such as styrene, α-methylstyrene, methylstyrene (including ortho-methylstyrene, meta-methylstyrene, and para-methylstyrene), indene, p-tert-butylstrene, methoxystyrene, 1-vinylnaphthalene, 3-ethyl-1-biphenylnaphthalene, and p-N,N-dimethylaminostyrene; (meth)acrylic vinyl monomers (the alcohol groups of these monomers may be linear or branched) such as (meth)acrylic acid, methyl (meth)acrylate, ethyl (meth)acrylate, propyl (meth)acrylate, butyl (meth)acrylate, pentyl (meth)acrylate, hexyl (meth)acrylate, cyclohexyl (meth)acrylate, heptyl (meth)acrylate, octyl (meth)acrylate, nonyl (meth)acrylate, decyl (meth)acrylate, dodecyl (meth)acrylate, stearyl (meth)acrylate, trimethylcyclohexyl (meth)acrylate, isobornyl (meth)acrylate, dicyclopentanyl (meth)acrylate, phenyl (meth)acrylate, benzyl (meth)acrylate, 2-methoxyethyl (meth)acrylate, 2-hydroxyethyl (meth)acrylate, glycidyl (meth)acrylate, 2-aminoethyl (meth)acrylate, γ-(methacryloyloxypropyl) trimethoxysilane (meth)acrylate, trifluoromethyl (meth)acrylate, and perfluorooctylethyl (meth)acrylate; conjugated dienes such as 1,3-butadiene, 1,3-pentadiene, 2,3-dimethyl-1,3-butadiene, 2,4-hexadiene, 2-phenyl-1,3-butadiene, and isoprene; nitriles such as acrylonitrile; vinyl esters such as vinyl formate, vinyl acetate, and vinyl propionate; and vinyl ethers such as methyl vinyl ether, ethyl vinyl ether, propyl vinyl ether, and butyl vinyl ether These monomers may be used individually, or a plurality of these monomers may be copolymerized. Among them, styrene-based monomers and (meth)acrylic acid-based monomers may be used in one or more embodiments of the present invention from the viewpoint of availability and various physical properties of the obtained vinyl-based comb copolymer.

From the viewpoint of ease of handling and reactivity, at least one or more vinyl-based monomers selected from the group consisting of styrene, methylstyrene (may be any of ortho-methylstyrene, meta-methylstyrene, and para-methylstyrene), α-methylstyrene, indene, and a (meth)acrylic acid ester represented by the following general formula (2), may be used in some embodiments.

[Chem. 4]

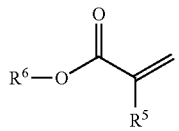

(2)

($R^5$ represents hydrogen or a methyl group, and $R^6$ represents a monovalent organic group having 1 to 25 carbon atoms.)

From the viewpoint that exhibition of characteristics as a lubricating oil composition over a long period of time can be expected, the (meth)acrylic acid ester of the above general formula (2) may be a methacrylic acid ester in some embodiments.

In the case of using two or more vinyl-based monomers (B) in combination, the ratio of the monomer components is not particularly limited. However, if it is necessary to increase the oil solubility of the vinyl-based comb copolymer, these vinyl-based monomers (B) may be used such that the total amount of vinyl-based monomers each having 6 or more carbon atoms is 50 to 5,000 parts by weight per 100 parts by weight of the total amount of vinyl-based monomers each having less than 6 carbon atoms.

On the other hand, if it is not particularly necessary to increase the oil solubility these vinyl-based monomers (B) may be used such that the total amount of vinyl-based monomers each having 6 or more carbon atoms is 10 to 5,000 parts by weight per 100 parts by weight of the total amount of vinyl-based monomers each having less than 6 carbon atoms.

According to one or more embodiments of the present invention, these monomers such as vinyl-based monomer (B) components may be copolymerized with any other monomers. At this time, the total amount of styrene, methylstyrene, and the (meth)acrylic acid ester represented by the above general formula (2) is may be 50% or more as a weight ratio from the viewpoint of physical properties in some embodiments.

The method for producing the vinyl-based comb copolymer according to one or more embodiments of the present invention is not particularly limited. However, for example, the vinyl-based comb copolymer according to one or more embodiments of the present invention can be produced by copolymerizing the polyisobutylene-based macromonomer (A) and the vinyl-based monomer (B) through radical polymerization, anionic polymerization, or the like.

The method of radical polymerization may be a free radical polymerization method used for producing a vinyl-based polymer, or a living radical polymerization method which has been actively studied in recent years.

In the case of producing the vinyl-based comb polymer according to one or more embodiments of the present invention through free radical polymerization, a radical polymerization initiator, and optionally a chain transfer agent and a solvent, are added to a mixture including the polyisobutylene-based macromonomer (A) and the vinyl-based monomer (B), and polymerization is carried out under the condition of about 250° C. or lower on the basis of the half-life temperature of the radical polymerization initiator, whereby the vinyl-based comb polymer can be produced.

Examples of the radical polymerization initiator include azo-based initiators, peroxide initiators, persulfate initiators, and redox initiators.

Examples of suitable azo-based initiators include, but are not limited to, 2,2'-azobis(4-methoxy-2,4-dimethylvaleronitrile), 2,2'-azobis(2-amidinopropane) dihydrochloride, 2,2'-azobis(2,4-dimethylvaleronitrile), 2,2'-azobis(isobutyronitrile), 2,2'-azobis(2-methylbutyronitrile), 1,1'-azobis(1-cyclohexanecarbonitrile), 2,2'-azobis(2-cyclopropylpropionitrile), and 2,2'-azobis(methylisobutyrate).

Examples of suitable peroxide initiators include, but are not limited to, benzoyl peroxide, acetyl peroxide, lauroyl peroxide, decanoyl peroxide, dicumyl peroxide, dicetyl peroxydicarbonate, t-butyl peroxy isopropyl nionocarbonate, di(4-t-butylcyclohexyl) peroxydicarbonate, di(2-ethylhexyl) peroxydicarbonate, t-butyl peroxypivalate, and t-butyl peroxy-2-ethylhexanoate.

Examples of suitable persulfate initiators include, but are not limited to, potassium persulfate, sodium persulfate, and ammonium persulfate.

Examples of suitable redox (oxidation and reduction) initiators include, but are not limited to, combinations of the above persulffite initiators with reducing agents such as sodium metabisulfite and sodium bisulfite; systems based on organic peroxides and tertiary amines such as a system based on benzoyl peroxide and dimethylaniline; and systems based on organic hydroperoxides and transition metals such as a system based on cumene hydroperoxide and cobalt naphthate.

Among them, radical polymerization initiators, from the viewpoint of availability and reactivity, may be selected from the group consisting of azo-based initiators and peroxide initiators. Specific examples of such radical polymerization initiators include 2,2'-azobis(isobutyronitrile), 2,2'-azobis(2-methylbutyronitrile), t-butyl peroxypivalate, di(4-t-butylcyclohexyl) peroxydicarbonate, t-butyl peroxyisopropyl monocarbonate, dicumyl peroxide, benzoyl peroxide, and acetyl peroxide. Among them, 2,2'-azobis(isobutyronitrile) or 2,2'-azobis(2-methylbutyronitrile) may be used in one or more embodiments, and 2,2'-azobis(2-methylbutyronitrile) may be used in another embodiment. These radical polymerization initiators may be used individually or two or more of these radical polymerization initiators may be used in combination.

The addition amount of these polymerization initiators is not particularly limited, but in one or more embodiments, it may be 0.001 to 20 parts by weight or 0.05 to 10 parts by weight per 100 parts by weight of the total amount of the polyisobutylene-based macromonomer (A) and the vinyl-based monomer (B).

If the addition amount is less than 0.001 parts by weight, sufficient curability may not be obtained. On the other hand, if the addition amount is greater than 20 parts by weight, problems such as insufficient mechanical properties or unintended foaming upon curing may occur.

A chain transfer agent may be used in production of the vinyl-based comb polymer according to one or more embodiments of the present invention. Examples of the chain transfer agent include, but are not limited to, mercaptans such as n-dodecyl mercaptan, tert-dodecyl mercaptan, lauryl mercaptan, γ-mercaptopropyitrimethoxysilane, γ-mercaptopropylmethyldimethoxysilane, γ-mercaptopropyltriethoxysilane, and γ-mercaptopropylmethyldiethoxysilane; and halogen-containing compounds. These chain transfer agents can be optionally used, for example, in the case where it is necessary to adjust the molecular weight of the comb polymer.

The radical polymerization can be carried out without a solvent, but may be carried out in a solvent that is an organic solvent or water. The solvent that can be suitably used is not particularly limited, but examples of such a solvent include: highly polar aprotic solvents such as dimethylsulfoxide (DMSO), dimethylformamide (DMF), N,N-dimethylacetamide (DMAc), and N-methylpyrrolidone; carbonate-based solvents such as ethylene carbonate and propylene carbonate; alcohol-based solvents such as methanol, ethanol, propanol, isopropanol, n-butyl alcohol, and tert-butyl alcohol; nitrile-based solvents such as acetonitrile, propionitrile, and benzonitrile; ketone-based solvents such as acetone, methyl ethyl ketone, and methyl isobutyl ketone; ether-based solvents such as diethyl ether and tetrahydrofuran; halogenated hydrocarbon-based solvents such as methylene chloride and chloroform; ester-based solvents such as ethyl acetate and butyl acetate; hydrocarbon-based solvents such as pentane, hexane, heptane, cyclohexane, octane, decane, benzene, toluene, and xylene; mineral oils; and synthetic oils.

Examples of mineral oils include a mineral oil obtained by refining a lubricating oil fraction, which is obtained by vacuum-distilling an atmospheric residual oil obtained by atmospheric distillation of crude oil, through one or more of treatments such as solvent deasphalting, solvent extraction, hydrocracking, solvent dewaxing, and hydrogenation refining, a wax isomerized mineral oil, and a base oil produced by a method of isomerizing GTL wax (gas-to-liquid wax).

Examples of synthetic oils include: polybutene or a hydride thereof poly-α-olefins such as 1-octene oligomer and 1-decease oligomer or hydrides thereof; diesters such as ditridecyl glutarate, di-2-ethylhexyl adipate, diisodecyl adipate, ditridecyl adipate, and di-2-ethylhexyl sebacate; polyol esters such as trimethylolpropane caprylate, trimethylolpropane pelargonate, pentaerythritol-2-ethylhexanoate, and pentaerythritol pelargonate; aromatic synthetic oils such as alkyl naphthalenes and alkyl benzenes; and mixtures thereof. One of these solvents can be used solely, or two or more of these solvents can be used in combination.

The vinyl-based comb polymer according to one or more embodiments of the present invention can also be produced through living radical polymerization. Generally, as a method of living radical polymerization, atom transfer radical polymerization (ATRP), or ARGET method (Activators Regenerated by Electron Transfer) which is a modification thereof, single electron transfer polymerization (SET-LRP), reversible addition fragmentation chain transfer polymerization (RAFT), nitroxide-mediated polymerization (NMP), living radical polymerization using organic tellurium (Organo Tellurium Mediated Living Radical Polymerization: TERP), etc., can be suitably used.

When atom transfer radical polymerization is mentioned as an example of manufacture through living radical polymerization, the method disclosed in WO 99/65963 by the same applicant can be suitably used.

The vinyl-based comb polymer according to one or more embodiments of the present invention can also be produced through anionic polymerization. Examples of an initiator used in anionic polymerization include, but are not particularly limited to, n-butyllithium (including s-butyllithium and t-butyllithium), mixtures of Na-naphthalene, K-benzophenone, etc., and G-rignard reagents.

The polyisobutylene-based macromonomer (A) has polymerization activity under light irradiation as described in WO 2013/047314 and Japanese Laid-Open Patent Publication No. 2013-216782 by the same applicant. Thus, the vinyl-based comb copolymer according to one or more embodiments of the present invention can also be produced by carrying out photopolymerization.

The method for producing the vinyl-based comb copolymer through photopolymerization is not particularly limited, but one example thereof is a method for obtaining the vinyl-based comb copolymer by irradiating a composition containing the polyisobutylene-based macromonomer (A), the vinyl-based monomer (B), and a compound capable of initiating polymerization upon irradiation with light (generally called a photopolymerization initiator), The polymerization initiator that can be used here is not particularly limited, but a compound that generates a radical species by light (hereinafter, also simply referred to as a photo radical initiator or a photo radical polymerization initiator) can be suitably used. Such compounds are not particularly limited, and the compounds described in WO 2013/047314 and Japanese Laid-Open Patent Publication No. 2013-216782 by the same applicant can be suitably used.

Among them, compounds having a hydroxyl group and a phenyl ketone structure, compounds having a benzophenone structure, and compounds having an acylphosphine oxide structure may be used in one or more embodiments of the present invention. Specifically benzophenone, 3-methoxy-benzophenone, 4-methylbenzophenone, 4,4'-bis(diethylaminabenzophenone, 4-chlorobenzophenone, 4,4'-dimethoxybenzophenone, 4-chloro-4'-benzylbenzophenone, 1-hydroxy-cyclohexyl-phenyl-ketone, 2-hydroxy-2-methyl-1-phenyl-propan-1-one, 2-benzyl-2-dimethylamino-1-(4-morpholinophenyl)-butanone-1, 2-methyl-1-[4-(methylthio)phenyl]-2-morpholinopropan-1-one, bis(2,4,6-trimethylbenzoyl)-phenylphosphine oxide, bis(2,6-dimethoxybenzoyl)-2,4,4-trimethylpentylphosphine oxide, and 2,4,6-trimethylbenzoyl-diphenyl-phosphine oxide may be used in one or more embodiments of the present invention.

Among them, in view of good curability and storage stability, benzophenone, 4,4'-bis(diethylamino)benzophenone, 2,2-dimethoxy-1,2-diphenylethane-1-one, 1-hydroxy-cyclohexyl-phenyl-ketone, 2-hydroxy-2-methyl-1-phenyl-propan-1-one, bis(2,6-dimethoxybenzoyl)-2,4,4-trimethylpentylphosphine oxide, 2,4,6-trimethylbenzoyl-diphenyl-phosphine oxide, bis(2,4,6-trimethylbenzoyl)-phenylphosphine oxide, and 2-methyl-1-[4-(methylthio)phenyl]-2-morpholinopropan-1-one may be used in one or more embodiments of the present invention.

These initiators may be used individually or two or more compounds selected from the group consisting of these initiators may be used in combination.

The photo radical polymerization initiator may include a compound having an alkylphenone structure or a compound having an acylphosphine oxide structure in one or more embodiments, and include a compound having an alkylphenone structure and a compound having an acylphosphine oxide structure in another embodiment. The compound having an alkylphenone structure may be one or more compounds selected from the group consisting of 1-hydroxy-cyclohexyl-phenyl-ketone, 2-hydroxy-2-methyl-1-phenyl-propan-1-one, 2-benzyl-2-dimethylamino-1-(4-morpholinophenyl)-butanone-1, and 2-methyl-1-[4-(methylthio)phenyl]-2-morpholinopropan-1-one in one or more embodiments, and may be 2-hydroxy-2-methyl-1-phenyl-propan-1-one in another embodiment. The compound having an acylphosphine oxide structure may be one or more compounds selected from the group consisting of bis(2,4,6-trimethylbenzoyl)-phenylphosphine oxide, bis(2,6-dimethoxybenzoyl)-2,4,4-trimethylpentylphosphine oxide, and 2,4,6-trimethylbenzoyl-diphenyl-phosphine oxide in one or more embodiments, and may be bis(2,4,6-trimethylbenzoyl)-phenylphosphine oxide in another embodiment.

The addition amount of the photo radical polymerization initiator is not particularly limited, but in one or more embodiments, it may be 0.001 to 20 parts by weight and more preferably 0.05 to 10 parts by weight, per 100 parts by weight of the total weight of the polyisobutylene-based macromonomer (A) and the vinyl-based monomer (B). If the addition amount of the photo radical polymerization initiator is less than 0.001 parts by weight, sufficient curability may not be obtained. On the other hand, if the addition amount of the photo radical polymerization initiator is greater than 20 parts by weight, uniform polymerization of the entire monomer mixture may not be able to be achieved due to local progress of the polymerization or the like. Thus, it may not be preferable that the addition amount of the photo radical polymerization initiator be greater than 20 parts by weight.

The photo radical polymerization initiator may be used individually, or may be used in combination with a thermal radical polymerization initiator. For example, in the step of irradiating a photocurable composition with UV light to obtain a cured product, a portion not irradiated with light may remain uncured. In such a case, the thermal radical polymerization initiator may be used in combination, because the uncured portion can also be cured by thermally treating the composition. Thus, the photo radical polymerization initiator and the thermal radical polymerization initiator can be used to supplement each other's features.

The curing time varies depending on a thermal radical polymerization initiator and additives to be used, reaction temperature, and the like, but is normally within the range of 1 minute to 5 hours.

The method for curing the curable composition according to one or more embodiments of the present invention is not particularly limited, but examples of the method include irradiation with light or an electron beam using a high pressure mercury lamp, a low pressure mercury lamp, an electron beam irradiation device, a halogen lamp, a light-emitting diode, a semiconductor laser, or the like, depending on the nature of a photo radical polymerization initiator to be used.

The viscosity index improver according to one or more embodiments of the present invention may be composed of the above vinyl-based comb copolymer.

A lubricating oil composition can be produced using the viscosity index improver according to one or more embodiments of the present invention. That is, the lubricating oil composition according to one or more embodiments of the present invention contains the above vinyl-based comb copolymer. In addition, the lubricating oil composition according to one or more embodiments of the present invention may contain at least a base oil and the viscosity index improver according to one or more embodiments of the present invention, and may contain other additives.

The amount of the vinyl-based comb copolymer contained in the lubricating oil composition according to one or more embodiments of the present invention, based on the total amount of the lubricating oil composition, may be 0.1 to 20.0% by weight, 0.5 to 15.0% by weight, or 1.0 to 10.0% by weight. If the amount is less than 0.1% by weight, the effect as the viscosity index improver may be less likely to be obtained. Thus, it may not be preferable that the amount be less than 0.1% by weight. On the other hand, if the amount is greater than 20% by weight, the viscosity of the lubricating oil significantly increases and there are no economic advantages. Thus, it may not be preferable that the amount be greater than 20% by weight.

As the lubricating oil base oil that can be used in the lubricating oil composition according to one or more embodiments of the present invention, an oil having a viscosity at 23° C. of 1 to 10,000 mPa·sec or 10 to 5,000 mPa·sec can be suitably used. If the viscosity is less than 1 mPa·sec, friction of each part of an internal combustion engine tends to be increased or consumption of the lubricating oil tends to increase. Thus, it may not be preferable that the viscosity be less than 1 mPa·sec. On the other hand, from the viewpoint of fuel consumption of the internal combustion engine, it may not be preferable that the viscosity be greater than 10,000 mPa·sec.

The viscosity at 23° C. of the lubricating oil composition according to one or more embodiments of the present invention may be 5 to 10,000 mPa·sec or 10 to 5,000 mPa·sec. If the viscosity is less than 5 mPa·sec, friction of each part of the internal combustion engine tends to be increased or consumption of the lubricating oil composition tends to increase. Thus, it may not be preferable that the viscosity be less than 5 mPa·sec. On the other hand, from the viewpoint of fuel consumption of the internal combustion engine, it may not be preferable that the viscosity be greater than 10,000 mPa·sec.

As the other additives, various known additives from which a person skilled in the art can easily infer the effect due to addition, may be used.

Examples of such additives include a viscosity index improver other than the vinyl-based comb copolymer according to one or more embodiments of the present invention, an antioxidant, an antiwear agent (or extreme pressure agent), a corrosion inhibitor, a rust inhibitor, a pour point depressant, a demulsifier, a metal deactivator, a defoamer, a (ashless) friction modifier, a metal detergent, and an ashless dispersant. These additives may be used individually, or two or more of these additives may be used in combination.

Examples of the viscosity index improver other than the vinyl-based comb copolymer in one or more embodiments of the present invention include polymethacrylate-based viscosity index improvers, polyisobutene-based viscosity index improvers, ethylene-propion copolymer-based viscosity index improvers, and styrene-butadiene hydrogenated copolymer-based viscosity index improvers.

The vinyl-based comb copolymer, the viscosity index improver, and the lubricating oil composition according to one or more embodiments of the present invention can be used in a wide range of fields such as internal combustion engine lubricating oil, and drive system lubricating oil (for example, automatic transmission oil, manual transmission oil, final reduction gear oil, etc.), but is useful particularly in the field of internal combustion engine lubricating oil. In this case, fuel for the internal combustion engine may be either gasoline or diesel fuel.

Generally, polyisobutylene, which is used as a fuel additive, can be expected to have cleanability. Thus, by adding polyisobutylene to diesel fuel (light oil), a fuel injector can be inhibited from getting dirty. The viscosity index improver and the lubricating oil composition including the vinyl-based comb copolymer in one or more embodiments of the present invention contain the polyisobutylene-based polymer. Thus, the viscosity index improver and the lubricating oil composition can be suitably used for a lubricating oil for an internal combustion engine for diesel fuel.

The present application claims the benefit of priority to Japanese Patent Application. No. 2017-050692 filed on Mar. 16, 2017. The entire contents of the specifications of Japanese Patent Application No. 2017-050692 filed on Mar. 16, 2017 are hereby incorporated by reference.

EXAMPLES

Hereinafter, one or more embodiments of the present invention will be described in more detail by means of examples. However, the present invention is not limited to these examples.

(Molecular Weight Measurement)

In the examples described below, "peak top molecular weight", "number-average molecular weight", "weight-average molecular weight", and "molecular weight distribution (ratio of the number-average molecular weight and the weight-average molecular weight)" were measured using size permeation chromatography (SEC) based on polystyrene standards. As a SEC system, LC Module 1 manufactured by Waters Corporation was used. As a GPC column (stationary phase), a column filled with a polystyrene cross-linked gel (Shodex GPC K-804 and GPC K-802.5, each manufactured by Showa Denko K.K.) was used. As a mobile phase, chloroform was used.

(Calculation of Functionalization Rate Fn)

The introduction numbers of (meth)acryloyl groups introduced to the ends of a macromonomer (P-1) and a macromonomer (Q-1) described later were determined as follows. Specifically through $^1$H NMR measurement, the introduction number of (meth)acryloyl groups within one molecule of a polymer was determined from the peak integration value of the vinyl proton derived from the (meth)acryloyl group with respect to the integration value of the proton derived from a used initiator (cumyl chloride in Production Example 2 described below).

(Viscosity Measurement)

The viscosity was measured at 23° C. and 60° C. using a cone plate type viscosity meter TVE-25H manufactured by Toki. Sangyo Co., Ltd.

(Solubility of Vinyl-Based Comb Copolymer)

When lubricating oil compositions obtained in the following examples and comparative examples were stored for 1 month at 23° C., the appearance of the lubricating oils was examined. The case where the lubricating oil composition was uniform, no separation of precipitates and the like was observed, and the solubility of the vinyl-based comb copolymer was good was regarded as "uniform". In addition, the case where no precipitation or separation was observed in the lubricating oil composition but cloudiness was observed therein was regarded as "cloudy". Furthermore, the case where separation of components was observed in the lubricating oil composition was regarded as "separation".

Production Example 1

Synthesis of Phenoxypropyl Methacrylate (End Functionalizing Agent)

Phenoxypropyl bromide (100 g, 465 mmol), potassium methacrylate (75.1 g, 604 mmol), and N,N-dimethylacetamide (291 g) were mixed at room temperature and stirred at room temperature for 48 hours. Next, the mixture was further stirred at 100° C. for 48 hours. Thereafter, the reaction mixture was cooled to room temperature, and deionized water (620 ml) and butyl chloride (310 ml) were added thereto, followed by thorough mixing. Then, the mixture was allowed to stand, thereby separating the organic phase and the aqueous phase. The separated aqueous phase was extracted five times with butyl chloride (110 ml), and the extracts were combined with the previous organic phase. The organic phase thus obtained was washed eight times with deionized water (450 ml), and then was dried with magnesium sulfate. The precipitate was separated by filtration, p-methoxyphenol (0.0102 g) was added to the filtrate, and the filtrate was evaporated under reduced pressure to obtain phenoxypropyl methacrylate as a colorless transparent liquid (97.4 g, 95%).

Production Example 2

Production of Macromonomer (A)

A vessel that was a 1 L separable flask was purged with nitrogen, then 27 mL of n-hexane (dried over molecular sieves) and 243 mL of butyl chloride (dried over molecular sieves) were added, and the mixture was cooled to −70° C. with stirring under a nitrogen atmosphere. Next, 85 mL (0.90 mol) of isobutylene, 1.74 g (0.0113 mol) of cumyl chloride, and 0.24 ml (0.0017 mol) of triethylamine were added to prepare a reaction mixture. The reaction mixture was cooled to −73° C., and then 0.59 mL (0.00540 mol) of titanium tetrachloride was added to initiate polymerization. After the initiation of polymerization, the concentration of residual isobutylene was measured by gas chromatography and polymerization of isobutylene was terminated when 99.9% or more of the added isobutylene was consumed. Next, 3.72 g (0.0169 mol) of the phenoxypropyl methacrylate synthesized in Production Example 1 and 4.94 mL (0.0450 mol) of titanium tetrachloride were added, and stirring was further continued at −75 to −80° C. for 3 hours, thereby carrying out a functionalization reaction.

After the end of the reaction, the catalyst was deactivated by pouring the reaction mixture into a large amount of methanol. The solvent consisting mainly of methanol, butyl chloride, and n-hexane was removed to obtain a viscous precipitate. The precipitate was dissolved in 1000 g of butyl chloride (solid content concentration: 11.7%), powdered activated carbon (product name "Taiko A", manufactured by Futamura Chemical Co., Ltd.) was added in an amount of 2% by weight with respect to the weight of the polymerization solution, and the mixture was stirred overnight at room temperature. The activated carbon was filtered out, 0.0124 g of 4-methoxyphenol was added to the obtained filtrate, and the solvent was evaporated under reduced pressure to obtain a polyisobutylene-based macromonomer (A) having a methacryloyl group at one end (hereinafter, referred to as macromonomer (P-1)). The number-average molecular weight Mn (based on polystyrene standards) of the macromonomer (P-1) was 7,224, the molecular weight distribution Mw/Mn of the macromonomer (P-1) was 1.31, and the number of methacryloyl groups introduced per molecule of the macromonomer (P-1) was 0.9.

Production Example 3

Production of Polyisobutylene-Based Macromonomer (Q-1) Having (Meth)Acryloyl Group at One End A vessel that was a 1 L separable flask was purged with nitrogen, then 40 mL of n-hexane (dried over molecular sieves) and 361 mL of butyl chloride (dried over molecular sieves) were added, and the mixture was cooled to −70° C. with stirring under a nitrogen atmosphere. Next, 63 mL (0.669 mol) of isobutylene, 3.45 g (0.0223 mol) of cumyl chloride, and 0.42 ml (0.0030 mol) of triethylamine were added to prepare a reaction mixture. The reaction mixture was cooled to −73° C., and then 0.91 mL (0.00825 mol) of titanium tetrachloride was added to initiate polymerization. After the initiation of polymerization, the concentration of residual isobutylene was measured by gas chromatography, and polymerization of isobutylene was terminated when 99.9% or more of the added isobutylene was consumed. Next, 9.2 g (0.0446 mol) of the phenoxyethyl methacrylate and 15.9 mL (0.145 mol) of titanium tetrachloride were added, and stirring was further continued at −75 to −80° C. for 3 hours, thereby carrying out a functionalization reaction. After the end of the reaction, the catalyst was deactivated by pouring the reaction mixture into a large amount of methanol. The solvent consisting mainly of methanol, butyl chloride, and n-hexane was removed to obtain a viscous precipitate. The precipitate was dissolved in 1000 g of butyl chloride (solid content concentration: 11.7%), 20 g of powdered activated carbon (product name "Taiko A", manufactured by Futamura Chemical Co., Ltd.) was added, and the mixture was stirred overnight at room temperature. The activated carbon was filtered out, 0.0120 g of 4-methoxyphenol was added to the obtained filtrate, and the solvent was evaporated under reduced pressure to obtain a polyisobutylene-based macromonomer (Q-1) having a methacryloyl group at one end (hereinafter, referred to as macromonomer (Q-1)). The number-average molecular weight Mn (based on polystyrene standards) of the macromonomer (Q-1) was 2,717, the molecular weight distribution Mw/Mn of the macromonomer (Q-1) was 1.34, and the number of acryloyl groups introduced per molecule of the macromonomer (Q-1) was 0.7.

Production Example 4

Preparation of Photopolymerization Initiator Composition (R-1)

20 parts by weight of DAROCUR 1173 (2-hydroxy-2-methyl-1-phenyl-propan-1-one, manufactured by Ciba Japan K.K.) and 10 parts by weight of IRGACURE 819 (bis(2,4,6-trimethylbenzoyl)-phenylphosphine oxide, manufactured by Ciba Japan K.K.) were weighed out and mixed well for 5 minutes using a spatula, to prepare a photopolymerization initiator composition (R-1).

Example 1

As described in Table 1, 100 parts by weight of the macromonomer (P-1), 167 parts by weight of methyl methacrylate (MMA, manufactured by Wako Pure Chemical Industries, Ltd.), and 3.33 parts by weight of polymerization initiator V59 (manufactured by Wako Pure Chemical Industries, Ltd., 2,2'-azo bis(2-methylbutyronitrile)) were added to 667 parts by weight of toluene, and stirring was continued at 115° C. for 3 hours. After the end of the reaction, the reaction mixture was added to a large amount of methanol to obtain a precipitate. The mixture mainly composed of toluene and methanol was removed by decantation, and the obtained precipitate was dried under vacuum at 80° C. to obtain a vinyl-based comb copolymer. Various physical properties of the obtained vinyl-based comb copolymer were as shown in Table 1.

A lubricating oil composition was prepared as follows using the obtained vinyl-based comb copolymer. Specifically, 100 parts by weight of process oil PW380 (manufactured by Idemitsu Kosan. Co., Ltd.) as a paraffinic lubricating oil base oil and 3 parts by weight of the above vinyl-based comb copolymer were added to 100 parts by weight of butyl chloride and dissolved at room temperature. Thereafter, butyl chloride was evaporated under reduced pressure to obtain a lubricating oil composition containing 3% by weight of the vinyl-based comb copolymer. A lubricating oil composition containing 5% by weight of the vinyl-based comb copolymer was also obtained in the same manner, except that 5 parts by weight of the above vinyl-based comb copolymer was used.

The viscosities of the obtained lubricating oil compositions were measured at 23° C. and 60° C., and the temperature dependence of viscosity of each lubricating oil composition was measured by the following equation, and is shown in Table 1.

temperature dependence of viscosity of lubricating oil composition (mPa·sec/° C.)=(viscosity at 60° C.)−(viscosity at 23° C.)/(60-23)   Equation (1)

Generally, a viscosity index improver is used for the purpose of reducing the temperature dependence of viscosity of a lubricating oil. In other words, the viscosity change of the lubricating oil may be smaller when the temperature changes. Therefore, in examples of one or more embodiments of the present invention, for the lubricating oil composition, the absolute value of the value of the temperature dependence defined by the above equation (1) may be smaller, the vinyl-based comb copolymer can be suitably used for a viscosity index improver, and further an indication of such a vinyl-based comb copolymer may be set.

Generally, a polyisobutylene-based viscosity index improver is known to have a remarkable effect of increasing the viscosity at each temperature, but a lubricating oil composition may have a low viscosity and exhibit lubricating performance. Therefore, the viscosity change of the lubricating oil may be smaller even when the vinyl-based comb copolymer according to one or more embodiments of the present invention is added. In order to investigate this point, by adding 3% by weight and 5% by weight of the vinyl-based comb copolymer, how much the viscosity was changed from the viscosity of process oil PW380 itself, which is a lubricating oil base oil, was examined. The results are shown as "viscosity change rate (%)" in Table 1.

The viscosity of process oil PW380 used here was 1,060 mPa·sec at 23° C. and 116.5 mPa·sec at 60° C. Therefore, the "viscosity change rate (%)" at 23° C. was obtained by the following equation (2), and the "viscosity change rate (%)" at 60° C. was obtained by the following equation (3).

viscosity change rate (%) at 23° C.=((viscosity at 23° C.)−1,060)/1,060×100   Equation (2)

viscosity change rate (%) at 60° C.=((viscosity at 60° C.)−116.5)/116.5×100   Equation (3)

Examples 2 to 6

Vinyl-based comb copolymers were obtained in the same manner as Example 1, except that the vinyl-based monomer (B), the polymerization solvent, and the polymerization initiator to be used were used as described in Table 1. Here, in the vinyl-based monomer (B), LMA represents lauryl methacrylate, SMA represents stearyl methacrylate, and St represents styrene.

Moreover, lubricating oil compositions were prepared in the same manner as Example 1, and the viscosities thereof were measured. The results were as described in Table 1.

Comparative Example 1

A vinyl-based comb copolymer was obtained in the same manner as Example 1, except that as described in Table 1, MMA, LMA, and SMA were each used in an amount of 33.3 parts by weight, 0.83 parts by weight of V59 was used as a polymerization initiator, and 233 parts by weight of toluene was used as a polymerization solvent. Moreover, a lubricating oil composition was prepared in the same manner as Example 1, and the viscosity thereof was measured. The results were as described in Table 1.

Comparative Example 2

A lubricating oil composition was prepared in the same manner as Example 1, except that the macromonomer (P-1) obtained in Production Example 2 was used solely instead of the vinyl-based comb copolymer in one or more embodiments of the present invention, and the viscosity of the lubricating oil composition was measured. The results were as described in Table 1.

Comparative Example 3

As described in Table 1, 100 parts by weight of the macromonomer (P-1) and the photopolymerization initiator (R-1) prepared in Production Example 4 were mixed using a spatula, and then the mixture was degassed to obtain a curable composition. Thereafter, the curable composition was poured into a metal frame (100 mm×100 mm×2 mm) made of SUS304 and was irradiated with UV light for 20 seconds using a UV irradiation device (manufactured by Fusion UV Systems Japan K.K., model: LH6) (irradiation conditions: illuminance of 1166 mW/cm$^2$ and light quantity of 2600 mJ/cm$^2$) to obtain a vinyl-based comb copolymer. Moreover, a lubricating oil composition was prepared in the same manner as Example 1, and the viscosity thereof was measured. The results were as described in Table 1. In Comparative Example 3, a homopolymer of the macromonomer (P-1) was obtained, and the molecular weight of the homopolymer is a molecular weight exceeding the exclusion limit molecular weight specific to the column used in the molecular weight measurement, and accurate measurement was not able to be performed. Thus, it is shown as "n.d." in Table 1.

Comparative Example 4

A vinyl-based comb copolymer was obtained in the same manner as Example 1, except that 100 parts by weight of the macromonomer (Q-1) produced in Production Example 3 was used as described in Table 1. Moreover, a lubricating oil composition was prepared in the same manner as Example 1, and the viscosity thereof was measured. The results were as described in Table 1.

TABLE 1

| | | | Example 1 | Example 2 | Example 3 | Example 4 |
|---|---|---|---|---|---|---|
| Preparation Formulation of Vinyl-based Comb Copolymer (parts by weight) | | Macromonomer (P-1) | 100 | 100 | 100 | 100 |
| | | Macromonomer (Q-1) | | | | |
| | Vinyl-based Monomer (B) | MMA | 167 | 83.3 | 167 | 66.7 |
| | | LMA | | | | 66.7 |
| | | SMA | | | | 66.7 |
| | | St | | | | |
| | Polymerization Initiator | V59 | 33.3 | 1.67 | 10.0 | 3.33 |
| | | Photopolymerization Initiator Composition (R-1) | | | | |
| | Polymerization Solvent | Toluene | 667 | 417 | 667 | 667 |
| Properties of Vinyl based Comb Copolymer | Molecular Weight | Peak Top Molecular Weight (Mp) | 18,681 | 18,906 | 12,126 | 17,776 |
| | | Weight-Average Molecular Weight (Mw) | 23,892 | 23,170 | 12,638 | 19,169 |
| | | Number-Average Molecular Weight (Mn) | 13,781 | 10,705 | 8,033 | 10,939 |
| | | Molecular Weight Distribution (Mw/Mn) | 1.73 | 2.16 | 1.57 | 1.75 |
| | Copolymer Composition (molar ratio) | Ratio of Macromonomer (P-1) (mol %) | 1.81 | 3.3 | 2.1 | 2.2 |
| | | Ratio Macromonomer (Q-1) (mol %) | | | | |
| | | Ratio of Vinyl-based Monomer (B) (mol %) | 98.2 | 96.7 | 97.9 | 97.8 |
| Properties of Lubricating Oil Composition | Lubricating Oil added with 3% by weight of Vinyl-based Comb Copolymer of the present invention | Measured Viscosity (mPa·sec) Temperature: 23° C. | 1,274 | 1,284 | 1,275 | 1,251 |
| | | Viscosity Change Rate (%) | 20 | 21 | 20 | 18 |
| | | Measured Viscosity (mPa·sec) Temperature: 60° C. | 137.2 | 137.6 | 139 | 135.8 |
| | | Viscosity Change Rate (%) | 18 | 18 | 19 | 17 |
| | | Temperature Dependence of Viscosity of Lubricating Oil Composition (mPa·sec/° C.) | −31 | −31 | −31 | −30 |
| | | Solubility of Vinyl-based Comb Copolymers | Uniform | Uniform | Uniform | Uniform |
| | Lubricating Oil added with 5% by weight of Vinyl-based Comb Copolymer of the present invention | Measured Viscosity (mPa·sec) Temperature: 23° C. | 1,440 | 1,462 | 1,407 | 1,438 |
| | | Viscosity Change Rate (%) | 36 | 38 | 33 | 36 |
| | | Measured Viscosity (mPa·sec) Temperature: 60° C. | 153.5 | 157.3 | 153.3 | 153.8 |
| | | Viscosity Change Rate (%) | 32 | 35 | 32 | 32 |
| | | Temperature Dependence of Viscosity of Lubricating Oil Composition (mPa·sec/° C.) | −35 | −35 | −34 | −35 |
| | | Solubility of Vinyl-based Comb Copolymers | Uniform | Uniform | Uniform | Uniform |

| | | | Example 5 | Example 6 | Comparative Example 1 |
|---|---|---|---|---|---|
| Preparation Formulation of Vinyl-based Comb Copolymer (parts by weight) | | Macromonomer (P-1) | 100 | 100 | |
| | | Macromonomer (Q-1) | | | |
| | Vinyl-based Monomer (B) | MMA | 167 | | 33.3 |
| | | LMA | | | 33.3 |
| | | SMA | | | 33.3 |
| | | St | | 167 | |
| | Polymerization Initiator | V59 | 0.333 | 3.33 | 0.833 |
| | | Photopolymerization Initiator Composition (R-1) | | | |
| | Polymerization Solvent | Toluene | 667 | 667 | 233 |
| Properties of Vinyl based Comb Copolymer | Molecular Weight | Peak Top Molecular Weight (Mp) | 73,370 | 11,525 | 17,776 |
| | | Weight-Average Molecular Weight (Mw) | 56,139 | 21,233 | 19,169 |
| | | Number-Average Molecular Weight (Mn) | 10,794 | 8,382 | 10,939 |
| | | Molecular Weight Distribution (Mw/Mn) | 5.20 | 2.53 | 1.75 |
| | Copolymer Composition (molar ratio) | Ratio of Macromonomer (P-1) (mol %) | 2.4 | 1.2 | |
| | | Ratio Macromonomer (Q-1) (mol %) | | | |
| | | Ratio of Vinyl-based Monomer (B) (mol %) | 97.6 | 98.8 | 100 |
| Properties of Lubricating Oil Composition | Lubricating Oil added with 3% by weight of Vinyl-based Comb Copolymer of the present invention | Measured Viscosity (mPa·sec) Temperature: 23° C. | 1,283 | 1,287 | 1,380 |
| | | Viscosity Change Rate (%) | 21 | 21 | 30 |
| | | Measured Viscosity (mPa·sec) Temperature: 60° C. | 136.8 | 137.2 | 119.4 |
| | | Viscosity Change Rate (%) | 17 | 18 | 2 |
| | | Temperature Dependence of Viscosity of Lubricating Oil Composition (mPa·sec/° C.) | −31 | −31 | −34 |
| | | Solubility of Vinyl-based Comb Copolymers | Uniform | Uniform | Uniform |
| | Lubricating Oil added with 5% by weight of Vinyl-based Comb Copolymer of the present invention | Measured Viscosity (mPa·sec) Temperature: 23° C. | 1,488 | 1,460 | 1,570 |
| | | Viscosity Change Rate (%) | 40 | 38 | 48 |
| | | Measured Viscosity (mPa·sec) Temperature: 60° C. | 155.3 | 155.2 | 119.7 |
| | | Viscosity Change Rate (%) | 33 | 33 | 3 |
| | | Temperature Dependence of Viscosity of Lubricating Oil Composition (mPa·sec/° C.) | −36 | −35 | −39 |
| | | Solubility of Vinyl-based Comb Copolymers | Uniform | Uniform | Uniform |

| | | | Comparative Example 2 | Comparative Example 3 | Comparative Example 4 |
|---|---|---|---|---|---|
| Preparation Formulation of Vinyl-based Comb Copolymer (parts by weight) | | Macromonomer (P-1) | 100 | 100 | |
| | | Macromonomer (Q-1) | | | 100 |
| | Vinyl-based Monomer (B) | MMA | | | 167 |
| | | LMA | | | |
| | | SMA | | | |
| | | St | | | |
| | Polymerization Initiator | V59 | | | 3.33 |
| | | Photopolymerization Initiator Composition (R-1) | 1 | | |
| | Polymerization Solvent | Toluene | 0 | | 667 |
| Properties of | Molecular Weight | Peak Top Molecular Weight (Mp) | 8,582 | n.d. | 17,509 |

TABLE 1-continued

|  |  |  |  |  |  |
|---|---|---|---|---|---|
| Vinyl based Comb Copolymer |  | Weight-Average Molecular Weight (Mw) | 9,472 | n.d. | 17,908 |
|  |  | Number-Average Molecular Weight (Mn) | 7,224 | n.d. | 7,201 |
|  |  | Molecular Weight Distribution (Mw/Mn) | 1.31 | n.d. | 2.49 |
|  | Copolymer Composition (molar ratio) | Ratio of Macromonomer (P-1) (mol %) | 100 | 100 |  |
|  |  | Ratio Macromonomer (Q-1) (mol %) |  |  | 4.8 |
|  |  | Ratio of Vinyl-based Monomer (B) (mol %) |  |  | 95.2 |
| Properties of Lubricating Oil Composition | Lubricating Oil added with 3% by weight of Vinyl-based Comb Copolymer of the present invention | Measured Viscosity (mPa · sec) Temperature: 23° C. | 1,360 | 1,855 | 1,559 |
|  |  | Viscosity Change Rate (%) | 28 | 75 | 47 |
|  |  | Measured Viscosity (mPa · sec) Temperature: 60° C. | 140.7 | 205.4 | 163.8 |
|  |  | Viscosity Change Rate (%) | 21 | 76 | 41 |
|  |  | Temperature Dependence of Viscosity of Lubricating Oil Composition (mPa · sec/° C.) | −33 | −45 | −38 |
|  |  | Solubility of Vinyl-based Comb Copolymers | Uniform | Uniform | Cloudy |
|  | Lubricating Oil added with 5% by weight of Vinyl-based Comb Copolymer of the present invention | Measured Viscosity (mPa · sec) Temperature: 23° C. | 1,543 | 2,539 | 2,025 |
|  |  | Viscosity Change Rate (%) | 46 | 140 | 91 |
|  |  | Measured Viscosity (mPa · sec) Temperature: 60° C. | 158.1 | 292.2 | 200.3 |
|  |  | Viscosity Change Rate (%) | 36 | 151 | 72 |
|  |  | Temperature Dependence of Viscosity of Lubricating Oil Composition (mPa · sec/° C.) | −37 | −61 | −49 |
|  |  | Solubility of Vinyl-based Comb Copolymers | Uniform | Uniform | Separation |

As shown in Examples 1 to 6, it is found that it is possible to produce the vinyl-based comb copolymer in one or more embodiments of the present invention from the polyisobutylene-based macromonomer (A) and various vinyl-based monomers (B) such as methyl methacrylate, lauryl methacrylate, stearyl methacrylate, and styrene. In addition, since the polyisobutylene-based macromonomer (A) and the vinyl-based monomer (B) have excellent copolymerizability vinyl-based comb copolymers having various structures can be produced.

As shown in Examples 1 to 6, it is found that the lubricating oil composition containing the vinyl-based comb copolymer in one or more embodiments of the present invention has a smaller absolute value of temperature dependence of viscosity than in Comparative Examples 1 to 4, and can be suitably used as a lubricating oil composition.

Since the vinyl-based comb copolymer in one or more embodiments of the present invention has a polyisobutylene-based polymer structure in a side chain, the vinyl-based comb copolymer has excellent oil solubility and thus also has excellent solubility in a lubricating oil base oil. Therefore, it is found that the vinyl-based comb copolymer in one or more embodiments of the present invention can be suitably used for a viscosity index improver for a lubricating oil, and can be further used for a lubricating oil composition having excellent viscosity characteristics.

Meanwhile, as shown in Comparative Example 1, when the polyisobutylene-based macromonomer (A) is not contained, it is recognized that the viscosity of the lubricating oil at low temperatures tends to easily increase, and, as a result, the temperature dependence of viscosity increases. Thus, it is found that it may not be preferable that the polyisobutylene-based macromonomer (A) be not contained.

Moreover, as shown in Comparative Examples 2 and 3, when the vinyl-based monomer (B) is not contained, it is found that the viscosity of the lubricating oil composition increases regardless of the temperature condition, and the temperature dependence of viscosity also increases. Thus, it is found that for lubricating oil characteristics, it may not be preferable that the vinyl-based monomer (B) be not contained.

Furthermore, as shown in Comparative Example 4, when the polyisobutylene-based macromonomer having a low functionalization rate was used as a raw material, in addition to viscosity increase at each temperature and high temperature dependence of viscosity, cloudiness and separation of components were observed during storage of the lubricating oil composition for 1 month. The reason for this is not necessarily clear, but it is considered that this is because, in production of the vinyl-based comb copolymer in the presence of a polyisobutylene-based polymer having no (meth)acryloyl group at an end, unintended by-products were produced and reduced the solubility of the lubricating oil composition.

Therefore, it is found that, in the method for producing the vinyl-based comb copolymer using the polyisobutylene-based macromonomer as a raw material, it is important to use a polyisobutylene-based macromonomer having at least 0.8 (meth)acryloyl groups within one molecule.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A vinyl-based comb copolymer that is a polymer of:
a polyisobutylene-based macromonomer; and
a vinyl-based monomer,
wherein the polyisobutylene-based macromonomer comprises at least 0.8 (meth)acryloyl groups represented by general formula (1) at one end of a main chain per molecule,

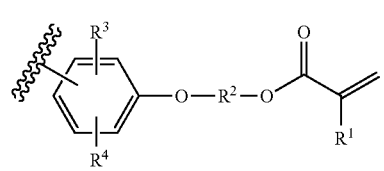

(1)

wherein $R^1$ is hydrogen or a methyl group, $R^2$ is a divalent saturated hydrocarbon group having 2 to 6 carbon atoms and having no hetero atoms, and $R^3$ and $R^4$ each are hydrogen, a monovalent hydrocarbon group having 1 to 20 carbon atoms, or an alkoxy group.

2. The vinyl-based comb copolymer according to claim 1, wherein the vinyl-based comb copolymer contains 0.05 to 20 mol % of a polyisobutylene-based macromonomer unit.

3. The vinyl-based comb copolymer according to claim 1, wherein a molecular weight distribution (Mw/Mn) of the polyisobutylene-based macromonomer ranges from 1.0 to 1.8.

4. The vinyl-based comb copolymer according to claim 1, wherein a number-average molecular weight (Mn) of the polyisobutylene-based macromonomer ranges from 1,000 to 200,000 as a value obtained by size exclusion chromatography (SEC) measurement based on polystyrene standards.

5. The vinyl-based comb copolymer according to claim 1, wherein $R^2$ in the general formula (1) is at least one divalent hydrocarbon group selected from the group consisting of —$CH_2CH_2$—, —$CH_2CH_2CH_2$—, and —$CH_2CH_2CH_2CH_2$—.

6. The vinyl-based comb copolymer according to claim 1, wherein $R^3$ and $R^4$ in the general formula (1) are each hydrogen.

7. The vinyl-based comb copolymer according to claim 1, wherein $R^1$ in the general formula (1) is a methyl group.

8. The vinyl-based comb copolymer according to claim 1, wherein the vinyl-based monomer is at least one selected from the group consisting of styrene, methylstyrene, α-methylstyrene, indene, and a (meth)acrylic acid ester represented by the following general formula (2),

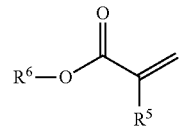

(2)

wherein $R^5$ is hydrogen or a methyl group, and $R^6$ is a monovalent organic group having 1 to 25 carbon atoms.

9. A method for producing the vinyl-based comb copolymer according to claim 1, the method comprising copolymerizing the polyisobutylene-based macromonomer with the vinyl-based monomer.

10. A viscosity index improver containing the comb copolymer according to claim 1.

11. A lubricating oil composition containing the comb copolymer according to claim 1.

* * * * *